United States Patent [19]
Thayer et al.

[11] Patent Number: 5,389,125
[45] Date of Patent: Feb. 14, 1995

[54] AUTOMATED SYSTEM FOR RECOVERY OF VOC'S FROM PROCESS AIR

[75] Inventors: Daniel D. Thayer, 165 W. Shore Rd., Auburn, Me. 04210; Bruce D. Barney, Freeport, Me.

[73] Assignee: Daniel D. Thayer, Auburn, Me.

[21] Appl. No.: 109,628

[22] Filed: Aug. 20, 1993

[51] Int. Cl.$^6$ .............................. B01D 53/04
[52] U.S. Cl. .............................. 95/11; 95/15; 95/17; 95/18; 95/21; 95/115; 95/143; 96/111; 96/112; 96/113; 96/122; 96/128; 96/130; 96/144; 96/146
[58] Field of Search ............... 95/1, 11, 14, 15, 17–19, 95/21, 115, 120, 124, 143, 147; 96/111–117, 122, 128, 130, 144, 146

[56] References Cited

U.S. PATENT DOCUMENTS

| | | | |
|---|---|---|---|
| 3,766,713 | 10/1973 | Leonard | 96/114 X |
| 4,074,984 | 2/1978 | Führing | 96/114 |
| 4,197,095 | 4/1980 | White, Jr. et al. | 96/112 X |
| 4,203,734 | 5/1980 | Winter et al. | 55/26 |
| 4,282,015 | 8/1981 | Bartoschek et al. | 96/112 |
| 4,414,003 | 11/1983 | Blaudszun | 55/18 |
| 4,421,532 | 12/1983 | Sacchetti et al. | 55/28 |
| 4,516,988 | 5/1985 | Winter | 55/59 |
| 4,846,852 | 7/1989 | Schweitzer et al. | 96/122 X |
| 4,859,216 | 8/1989 | Fritsch | 96/112 X |
| 4,895,580 | 1/1990 | Morioka et al. | 96/112 X |
| 4,963,168 | 10/1990 | Spencer | 96/122 |
| 4,966,611 | 10/1990 | Schumacher et al. | 96/111 X |
| 4,986,836 | 1/1991 | Tandon | 96/111 |
| 4,995,890 | 2/1991 | Croudace | 96/111 |
| 5,171,336 | 12/1992 | Shulick | 96/115 |

Primary Examiner—Robert Spitzer
Attorney, Agent, or Firm—Daniel H. Kane

[57] ABSTRACT

A system and method for removing volatile organic compounds (VOC's) from a circulating airstream utilizes first and second adsorption beds and first and second adsorption paths alternately coupling the circulating airstream to the respective first and second adsorption beds for removing VOC's during adsorption cycles. First and second desorption loops alternately couple a desorption inert gas through the respective first and second adsorption beds for desorption and regeneration and for recovering VOC's in a VOC condenser. System parameter sensors are distributed in the first and second adsorption paths and first and second desorption loops for sensing system parameters. A programmable controller is coupled to the system parameter sensors, to flow control valves, and to the inert gas heater for controlling the system in response to sensed system parameters. The system parameter sensors include a variety of temperature, $O_2$, VOC, pressure, and differential pressure sensors. Separate flooding lines with controllable flooding valves couple the inert gas source to the first and second adsorption beds and desorption loops. The programmable controller is programmed to determine an alarm condition in response to specified system parameters exceeding programmed alarm threshold values and provide alarm condition responses including closing flow control valves for isolating the first and second adsorption beds and desorption loops, opening the flooding valves and flooding with inert gas the first and second adsorption beds and desorption loops, and turning off the heater. A variety of other automated operational control features are described.

30 Claims, 6 Drawing Sheets

ADSORB CYCLE FLOW CHART

AUTOMATED SYSTEM FOR RECOVERY OF VOC'S FROM PROCESS AIR

TECHNICAL FIELD

This invention relates to systems for removing volatile organic compounds (VOC's) from process air in order to meet air quality and safety standards and for recovering and recycling the potentially valuable chemicals. A pair of adsorption beds such as activated carbon beds alternate between adsorption and desorption cycles for continuous purging and recovery of VOC's from the process air. The invention provides a new automated system of operation with a novel arrangement of system parameter sensors, programmable system parameter thresholds, and a variety of operational, safety, and emergency responses to the defined system parameter thresholds. As a result, risk of inefficient or improper operation and risk of fire or other hazardous conditions are minimized. The automated system is controllable and programmable by a programmable microcontroller and may be accessed, overridden, modified, or reprogrammed by a microprocessor on site or by telephone line from a remote location for flexible operation in different environments and applications. The system is constructed for rapid deployment at a process site or plant and can be implemented in modular units according to the process or plant exhaust air capacity requirements.

BACKGROUND ART

According to the basic system and process for recovering VOC's and solvents from circulating process air, activated carbon beds or other adsorption material filter beds are utilized in alternating adsorption and desorption cycles. The volatile organic chemicals and solvents are removed from exhaust air circulating from a chemical process plant or manufacturing process area by passing the process air through the adsorption filter bed. The VOC's and solvents are adsorbed onto the surfaces of the adsorption bed during the adsorb or purification cycle. The purified or purged process air can then be recirculated through the chemical or manufacturing plant or be otherwise exhausted.

When the adsorption bed such as an activated carbon bed is saturated with adsorbed solvents and VOC's, the inlet and outlet ducts of the bed are switched to other lines for the desorption or regeneration cycle. A desorbing inert gas such as nitrogen is heated and circulated through the adsorption bed to desorb solvents and VOC's into the desorption inert gas flow. The solvents and VOC's are then recovered from the desorb inert gas flow in a condenser through which cooling liquid is circulated. Solvent and VOC condensate is drained from the condenser to a storage tank. The inert gas such as nitrogen is recirculated from the condenser for the continuing desorption and regeneration of the adsorption filter bed. Typically, two adsorption beds are provided, alternating in opposite phases between adsorb and desorb cycles so that one adsorption bed is always available for removing VOC's from exhaust air.

A number of United States Patents were found describing variations and enhancements on this basic system and method. The Sacchetti et al. U.S. Pat. No. 4,421,532 describes a process for removing and recovering volatile organic substances from industrial waste gases. The Sacchetti et al. patent describes the addition of an unusual step in the desorption or regeneration cycle. After circulating heated nitrogen gas through the activated carbon bed, the $N_2$ flow is cooled followed by condensing and recovering the solvents or VOC's. According to the step of Sacchetti et al. however the cooled nitrogen gas is then passed through the adsorbent bed to remove residual solvents and VOC's. The nitrogen gas is then reheated and the desorption cycle continues. Sacchetti et al. thus recover solvents and VOC's from the inert desorption gas partly by condensation in the condensing/cooling step and partly by readsorption onto the surfaces of the activated carbon bed.

The Winter U.S. Pat. No. 4,516,988 describes a method and apparatus for purifying a gas stream in a sorption filter in which the volumetric flow of gas to be purified is combined with a volumetric flow of circulating purified gas which is larger than the volumetric flow of the gas to be purified. Winter contends that this blending of volumetric flows is more effective in achieving and maintaining a desired or specified emission value. The Winter et al. U.S., Pat. No. 4,516,988 is directed to the problem of selective adsorption of vaporous or gaseous impurities, that is to the separation of the solvents and VOC's from each other. Winter et al. accomplishes this by providing two filter beds in tandem or in series and maintaining the two filter beds at two different temperatures. The first filter bed is maintained at a sufficiently high temperature to adsorb solvents or VOC's of low volatility while passing through the impurities of higher volatility. The second adsorption filter is maintained at a lower temperature than the first adsorption filter to adsorb the impurities of higher volatility. Winter et al. are therefore able to achieve fractional separation.

The Blaudszun U.S., Pat. No. 4,414,003 describes another process and apparatus for the recovery of solvents incorporating a positive compression step of compressing the inert desorbing gas after it is "laden" with solvent. The compressed inert gas stream laden with solvent vapors is cooled "in an expansion turbine while delivering work". Blaudszun uses a two bed system for maintaining oxygen concentration in the stream of nitrogen gas "below the maximally admissible level". According to the Blaudszun process, the flow of nitrogen gas through the saturated activated carbon bed during the desorption cycle may be diverted through the second activated carbon bed in series in order to maintain the sensed oxygen concentration "below the maximally admissible level".

A disadvantage of such existing VOC recovery systems is that hazardous conditions may occur during either adsorption or desorption cycles. For example upon initiation of a desorption phase, a threshold combination of high temperatures, VOC concentrations, and oxygen ($O_2$) may create combustible conditions resulting in fire or explosive reactions. Similarly, during an adsorption phase, excessively high VOC concentration and temperatures may also create combustible conditions. Fire and other hazardous conditions may spread between the VOC recovery system and the plant source of process air.

Another disadvantage of conventional VOC recovery systems is that such systems may operate inefficiently. System parameters may not be maintained at preferred values for optimum performance and efficiency. Furthermore, such systems are not flexibly adaptable to different environments and applications for recovering different VOC's and solvents.

OBJECTS OF THE INVENTION

It is therefore an object of the present invention to provide an automated system for purging and recovery of VOC's from process air that minimizes the risk of fire or other hazardous conditions in the VOC recovery system. More generally the invention is intended to optimize efficient and safe operation of the VOC recovery system.

Another object of the invention is to provide an automated VOC recovery system that monitors system parameters and initiates safety and emergency measures in response to sensed system parameters exceeding programmed system parameter thresholds. The system is also intended to provide isolation of the plant source of exhaust process air from the automated VOC recovery system under emergency conditions.

A further object of the invention is to provide a system for recovery of VOC's from process air that is automatically controlled and operated in response to sensed system parameters to optimize performance and which can be overridden, modified, or reprogrammed from on site or remote computers. The invention therefore provides a flexible system that can be readily adapted to different environments for recovery of different identified VOC's and solvents according to the application. The system can also be implemented in modular increments according to the capacity requirements.

DISCLOSURE OF THE INVENTION

In order to accomplish these results the present invention provides a system for removing volatile organic compounds (VOC's) from a circulating airstream having first and second adsorption beds and first and second adsorption paths alternately coupling the circulating airstream of exhaust air to the respective first and second adsorption beds. Thus during normal operation one of the adsorption beds remains in the adsorb cycle.

For the desorb cycle the invention provides a desorption inert gas source, a heater for heating the desorption inert gas, and a VOC condenser. First and second desorption loops alternately couple the desorption inert gas through the respective first and second adsorption beds for desorption and regeneration of the respective first and second adsorption beds and for recovering VOC's in the VOC condenser. Flow control valves direct the circulating airstream in the respective first and second adsorption paths and direct the desorption inert gas in the respective first and second desorption loops.

According to the invention a plurality of system parameter sensors are distributed in the first and second adsorption paths and first and second desorption loops for sensing system parameters. A programmable controller is coupled to the system parameter sensors, flow control valves, and heater for controlling the system in response to the sensed system parameters.

In the preferred example embodiment the system parameter sensors include temperature sensors in the first and second adsorption paths and first and second desorption loops upstream and downstream from the respective first and second adsorption beds. VOC sensors are located downstream from the first and second adsorption beds, an $O_2$ sensor is located in a common path portion of the first and second desorption loops, a pressure sensor is incorporated in a common path portion of the first and second desorption loops, and a pressure switch is located at the pressurized desorption inert gas source. The flow control valves are constructed also to provide isolation valves in the first and second adsorption paths and first and second desorption loops for isolating the first and second adsorption beds.

In the preferred example the inert gas source is constructed with separate flooding lines coupled to the first adsorption bed, second adsorption bed, and the desorption loops. The separate flooding lines are controlled by controllable flooding valves coupled to the programmable controller for flooding the first adsorption bed, second adsorption bed and desorption loops with inert gas in response to an alarm condition.

According to the invention the programmable controller is programmed to determine an alarm condition in response to specified system parameters sensed by the system parameter sensors reaching or exceeding programmed alarm threshold values. The programmable controller is also constructed to initiate an alarm condition response including closing the flow control valves thereby isolating the first adsorption bed, second adsorption bed, and the first and second desorption loops. The flooding valves are opened by the programmable controller in response to an alarm condition thereby flooding with inert gas the first adsorption bed, second adsorption bed, and said first and second desorption loops. The programmable controller also turns off the heater in response to an alarm condition.

In the preferred example a number of alarm conditions are identified. A first alarm condition occurs if $O_2$ concentration sensed by the $O_2$ sensor in a desorption loop during desorption and regeneration of an adsorption bed has an $O_2$ concentration value above a programmed alarm threshold first $O_2$ concentration value for a specified time period. A second alarm condition is indicated if temperature of heated inert gas circulating in a desorption loop reaches a temperature value above a programmed alarm first temperature threshold value. A third alarm condition is indicated if temperature of the circulating airstream in an adsorption path reaches a temperature value above a programmed alarm second temperature threshold value. A fourth alarm condition occurs when inert gas pressure sensed by the pressure switch at the inert gas source has a pressure value below a programmed alarm threshold first pressure value for a specified time period. A fifth alarm condition occurs when inert gas pressure sensed by a pressure sensor in the desorption loop has a pressure value below a programmed alarm threshold second pressure value for a specified time period.

Other alarm conditions include VOC concentration sensed in the circulating airstream downstream from an adsorption bed having a value above a programmed alarm threshold first VOC concentration value, and a temperature differential too great across an adsorption bed during adsorption, desorption, or a cooling cycle. For a number of the alarm conditions there is a time component, and the alarm condition is indicated only if a threshold condition occurs for a programmed time interval. The cooling cycle refers to the cooling and resting condition of an adsorption bed following the desorb cycle of purification and regeneration.

In the preferred example embodiment a circulating airstream fan is positioned in a common portion of the first and second adsorption paths for circulating the solvent laden airstream through the first or second adsorption bed. A circulating inert gas fan is positioned in a common portion of the first and second desorption loops for circulating desorption inert gas through the first or second adsorption bed. A first differential pressure sensor is coupled across the circulating airstream fan and a second differential pressure sensor is coupled across the circulating desorption inert gas fan. The first and second differential pressure sensors are coupled to the programmable controller. The programmable controller is also programmed to determine an alarm condition in response to differential pressure sensed across a respective fan having a differential pressure value below a programmed alarm threshold indicating failure of the circulating fan.

The programmable controller not only initiates alarm condition responses but also controls and maintains system operation at an efficient level in response to system parameters monitored by the system parameter sensor. For example the programmable controller is programmed to initiate a desorption cycle for desorption and regeneration of an adsorption bed when VOC concentration in process air at the adsorption bed outlet exceeds a second VOC concentration threshold value. A cycle switch coupled to the flow control valves switches the saturated adsorption bed from an adsorption path to a desorption loop. The programmable controller turns on the circulating inert gas fan and directs unheated inert gas through the adsorption bed to be recharged. The programmable controller is programmed to detect $O_2$ concentration in the circulating inert gas through the adsorption bed to be recharged. The programmable controller turns on the heater only for a sensed $O_2$ concentration level below a programmed threshold second $O_2$ concentration value.

According to the invention a separate computer such as a microprocessor may be coupled to the programmable controller for diagnosing system operation from system parameters sensed by the system parameter sensors, for changing or overriding the programming of the programmable controller, and for reprogramming the programmable controller including reprogramming system parameter threshold values for controlling operational, safety, and alarm condition responses. The separate computer may be located at the site of the VOC recovery system or at a remote location coupled through modem and telephone lines.

An advantage of the system of the present invention is that it is flexible and readily adaptable for applications in different environments for recovering different types of solvents and VOC's. The programmable controller is readily reprogrammed for example changing the system parameter threshold values for efficient performance according to the application and according to the VOC's and solvents to be recovered. The system also lends itself to supplementing in modular increments according to the capacity requirements of a chemical plant or manufacturing operation.

The system incorporates a variety of additional features, for example preconditioning the exhaust air or solvent laden process air to be purged. According to this feature of the invention exhaust air to be purged is dehumidified by a preconditioning cooling coil upstream from the VOC recovery system to reduce water vapor load in the adsorption beds. The process air is also filtered through a preconditioning filter for removing particulates that may clog or reduce the efficiency of the adsorption beds.

The invention also contemplates a new method for removing volatile organic compounds from a circulating airstream according to the steps implemented by the system summarized above and hereafter described in detail.

Other objects, features and advantages of the invention are set forth in the following specification and accompanying drawings.

BRIEF DESCRIPTION OF THE TABLES

TABLE I is a summary list of the data inputs from the automated VOC recovery system parameter sensors to the programmable logic controller (PLC).

TABLE II is a summary list of data outputs from the programmable logic controller for initiating system operations and alarm condition responses according to selected data inputs from TABLE I.

TABLE III is a summary list of alarm conditions determined by the programmable controller according to the identified system parameter sensed conditions.

TABLE IV is a summary list of alarm condition response steps and actions initiated by the programmable logic controller in response to the sensed alarm conditions.

TABLE V is a summary list of exemplary threshold values for sensed system parameters for initiating automated operating steps of the VOC recovery system and for determining alarm conditions.

DETAILED DESCRIPTION OF PREFERRED EXAMPLE EMBODIMENTS & BEST MODE OF THE INVENTION

Figure 1:
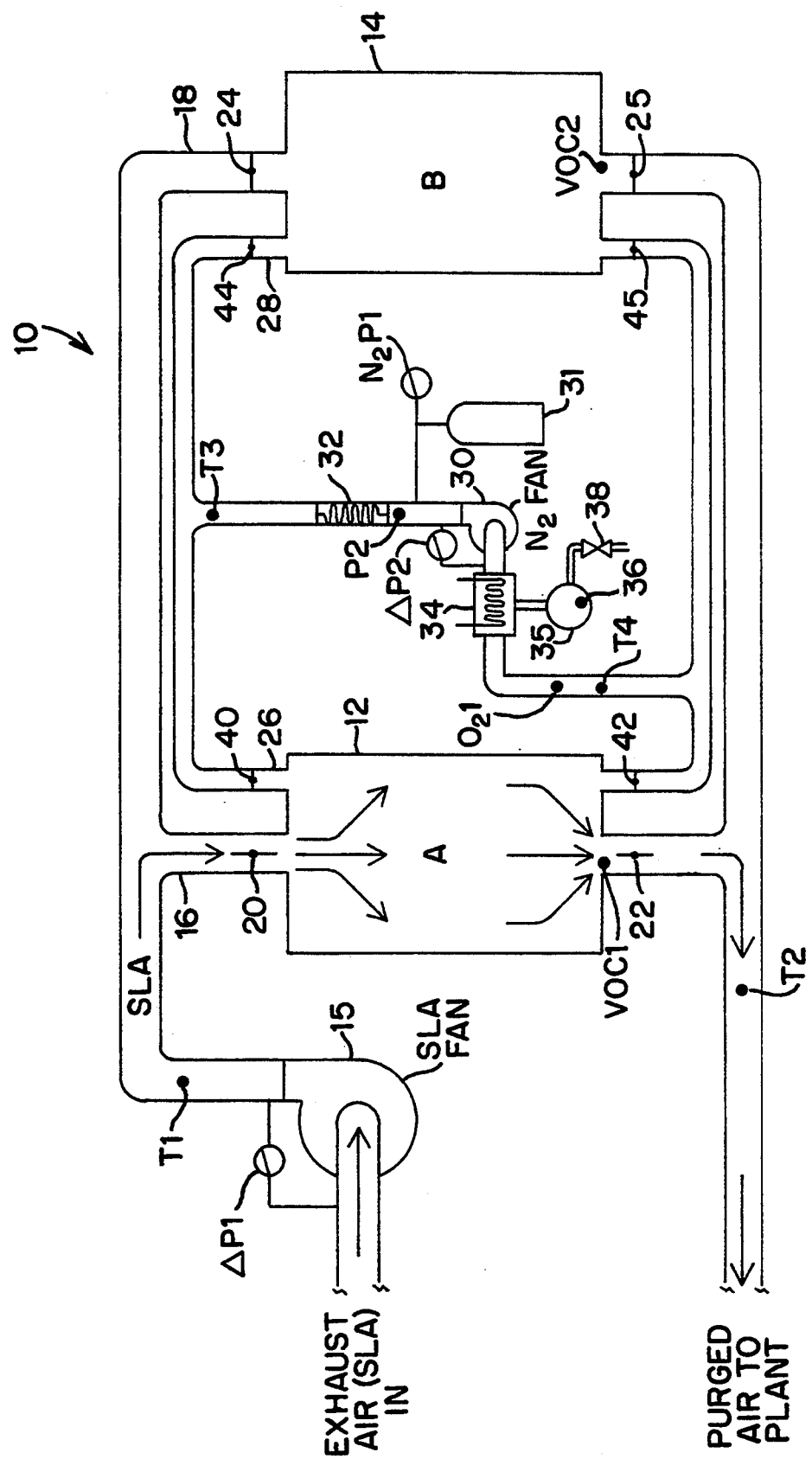
FIG. 1 is a simplified system block diagram of the automated VOC recovery system according to the invention with adsorption BED A in the adsorb phase and adsorption BED B in the rest phase.

An automated system 10 for recovery of VOC's from process air according to the invention is illustrated in FIGS. 1–7. As shown in FIG. 1 the system incorporates dual adsorption beds 12,14 designated BED A and BED B. The beds are filled with activated carbon granules for adsorbing VOC's such as industrial solvents from a circulating airstream of solvent laden air SLA delivered by SLA fan 15. The solvent laden air or VOC laden air is typically vented from a chemical process plant, manufacturing location, printing operation etc. and is variously referred to as exhaust air, SLA, process air, circulating airstream, etc.

The two adsorption beds, BED A and BED B are positioned in alternative parallel adsorption paths 16 and 18. Adsorption path 16 containing BED A is controlled by circulating airstream flow control valves 20 and 22. Adsorption path 18 containing BED B is controlled by circulating airstream flow control valves 24 and 25. In the system configuration of FIG. 1 BED A is in the adsorb cycle or adsorb phase with flow control valves 20 and 22 open permitting circulation of the airstream through BED A. VOC's and solvents in the SLA are therefore adsorbed onto the adsorbent surfaces of the filter material in BED A.

BED B is in the rest mode with flow control valves 24 and 25 in closed position closing off the second adsorption path 18. BED B has previously been recharged or regenerated by a desorb cycle hereafter described and is ready for use as an adsorption bed when BED A is saturated. The outlets of BED A and BED B are combined for recirculating purged or purified air to the plant or for otherwise exhausting the air.

While adsorbent beds BED A and BED B are activated carbon beds, any other suitable adsorbent filter material may be used in the adsorbent beds. For example zeolites, silica, silica gels, etc. may be used for the adsorbent materials.

Figure 2:
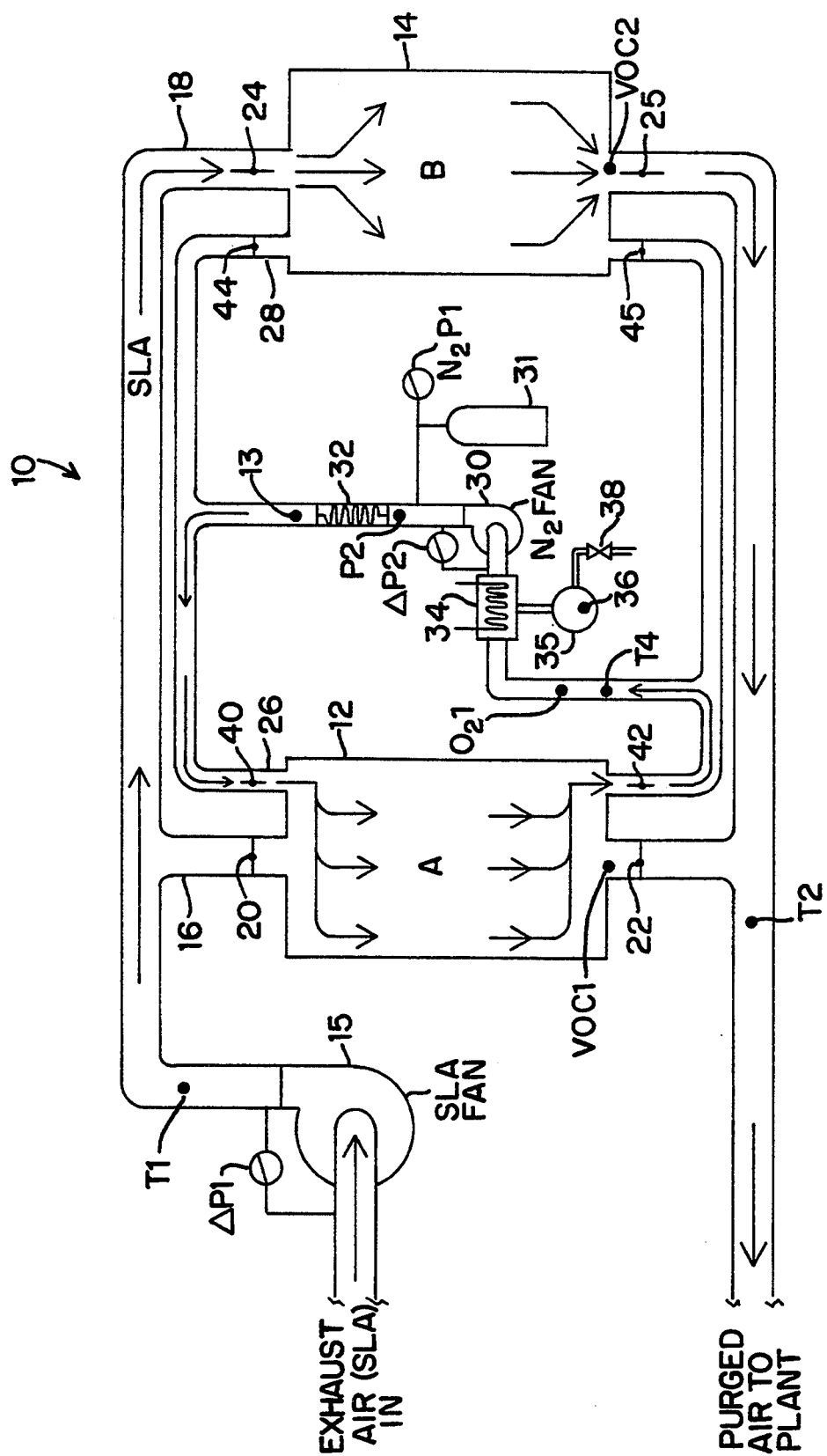
FIG. 2 is a simplified system block diagram of the automated VOC recovery system with adsorption BED B in the adsorb phase and adsorption BED A in the desorb phase.

Referring to FIG. 2 the automated VOC recovery system 10 is shown in a different configuration following saturation of BED A. Saturation of BED A following the adsorb cycle of FIG. 1 is ascertained by a programmable controller coupled to VOC sensor VOC1 at the outlet of BED A. For example when VOC concentration exceeds 400 PPM, the programmable logic controller hereafter described closes the flow control valves 20,22 shutting off the first adsorption path 16 and opens flow control valves 24 and 25 directing the circulating airstream through the second adsorption path 18 and the second adsorbent bed, BED B. A second VOC sensor VOC2 monitors VOC concentrations at the outlet of BED B. BED A can now be recharged or regenerated in a desorb cycle.

A desorb cycle is initiated by directing desorption inert gas through one of the desorption loops 26,28. Desorption loops 26 and 28 have a common path portion including the elements for implementing a desorb cycle. The desorption inert gas is derived from a pressurized source 31 of nitrogen $N_2$ and a nitrogen fan 30 delivers the nitrogen gas to the respective desorption loops 26,28. The common path also includes a heater 32 for example with two stages of heating elements for heating the $N_2$, and a condenser 34 for recovering VOC's and solvents from the desorbing inert gas as hereafter described. Flow control valves 40 and 42 couple the first desorption loop 26 to BED A while flow control valves 44,45 couple the second desorption loop 28 to BED B.

As shown in FIG. 1 both of the desorption loops are shut off with flow control valves 40,42,44, and 45 closed. The desorption loops as shown in FIG. 1 are inactive or quiescent during the rest mode while one of the adsorption beds is in an adsorb cycle, and after the other adsorption bed has been recharged or regenerated. In the example of FIG. 1 BED A is active in an adsorb cycle while BED B is in the rest mode following regeneration by a desorb cycle. The desorption loops 26 and 28 are therefore inactive and desorb flow control valves 40,42,44, and 45 are closed.

Referring to FIG. 2 the automated VOC recovery system 10 is shown in the different configuration where BED A is undergoing a desorb cycle while BED B is in an active adsorb cycle. The desorb cycle for recharging and regenerating BED A is initiated when the $N_2$ fan 30 is turned on by the programmable controller while heater 32 remains off. At the same time flow control valves 40 and 42 are opened to permit circulation of the cool nitrogen gas for driving oxygen from BED A. Flow control valves 44 and 45 remain closed shutting off the second desorption loop 28.

Oxygen in the circulating inert gas is monitored by $O_2$ sensor $O_21$. When $O_2$ concentration in the circulating desorption inert gas falls below 1% LEL the programmable controller hereafter described turns on the heater 32 for heating the inert gas. Cold water is circulated in the condenser 34 for condensing VOC's and solvents desorbed from the activated carbon surfaces of BED A. Condenser 34 collects recovered VOC's and solvents in a VOC container 35 incorporating a liquid level sensor 36 which provides data to the programmable logic controller. Drain valve 38 is used to drain the VOC container 35. Circulation of cooling condensing water in the condenser 34 is controlled in response to temperature of the circulating inert gas. For example as the temperature exceeds 260° F., cooling water is circulated in the condenser 34 to initiate condensation recovery of VOC's and solvents. Typically, the temperature of the heater may be set for example in the range of 316° F.-320° F. for recovering solvents such as propanol from printing process air.

Several pressure sensors are strategically positioned in the automated solvent recovery system 10. Pressure switch $N_2P1$ senses pressure of inert nitrogen gas at tank 31. Pressure sensor P2 senses pressure in the common path portion of the desorption loops. Differential pressure sensor P1 senses pressure drop across the SLA fan 15 for indicating failure of the SLA fan. Similarly differential pressure sensor P2 is coupled across the $N_2$ fan 30 for sensing failure of the nitrogen fan. All of the pressure sensors as well as all of the other system parameter sensors are coupled to the programmable controller hereafter described.

Temperature sensor T1 senses the temperature of the in-flowing circulating airstream, exhaust air or process air while temperature sensor T2 senses the temperature of the outgoing purged or purified air recirculating to the plant. Together temperature sensors T1 and T2 also provide a measure of differential temperature across the respective adsorption beds 12,14. Temperature sensor T3 senses temperature of the inert nitrogen gas flowing into an adsorption bed during a desorb cycle after the circulating nitrogen gas is heated by heater 32. Temperature sensor T4 senses the temperature of the circulating inert nitrogen gas at the outlets of the respective adsorbent beds 12,14 upstream from condenser 34. Together temperature sensors T3 and T4 also provide another measure of differential temperatures across the adsorption beds 12,14.

Figure 3:
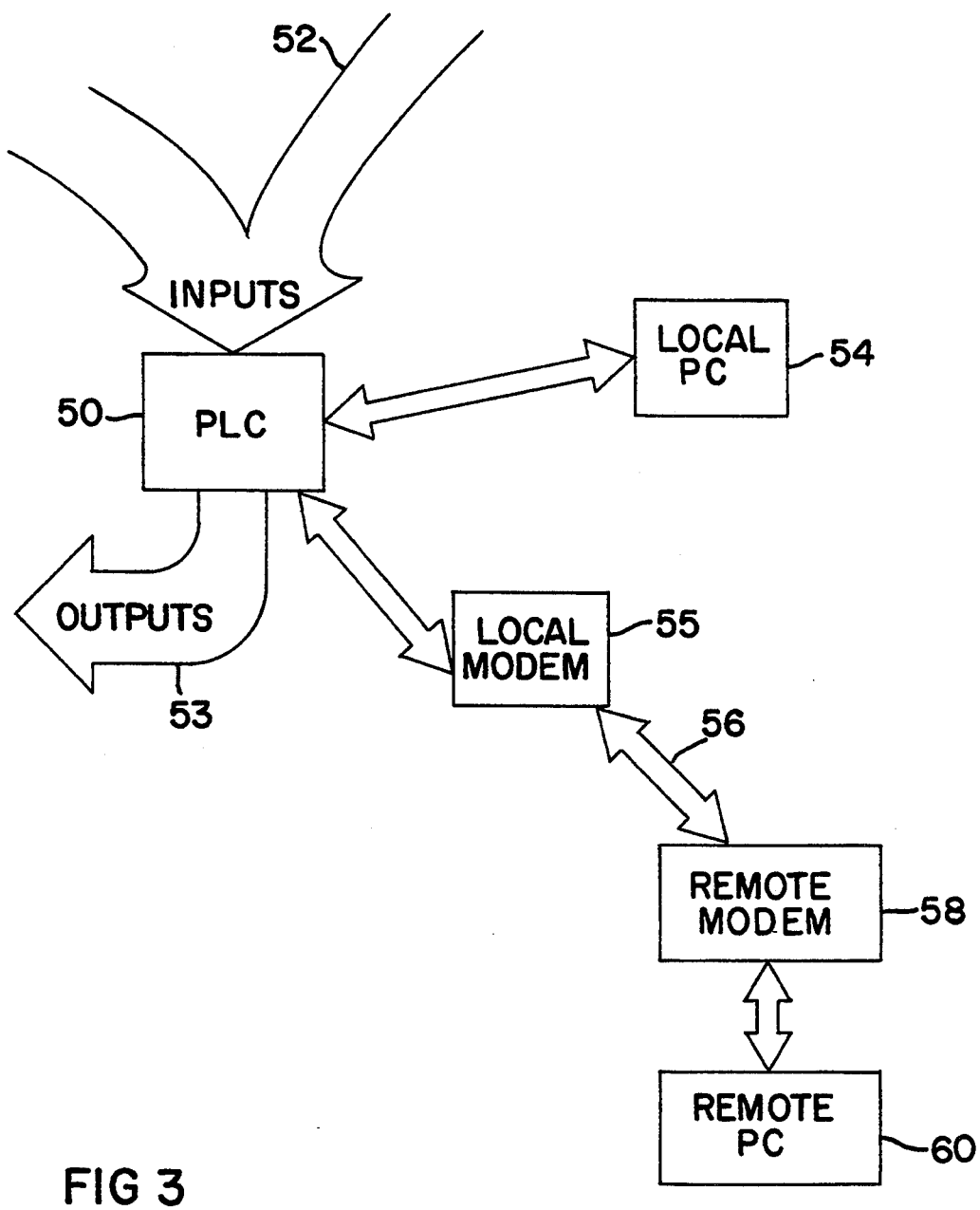
FIG. 3 is a block diagram with data flow indicated by arrows showing the automated programmable logic control and computer control for the VOC recovery system.

The control system and flow of data for the automated VOC recovery system are shown generally in the block diagram of FIG. 3. A programmable logic controller PLC 50 receives data inputs 52 from all of the system parameter sensors. The data inputs 52 to PLC 50 are summarized in TABLE I. Thus data inputs include differential pressure across the SLA fan 15 from sensor P1, differential pressure across the $N_2$ fan 30 from sensor P2, and nitrogen pressure in the common portion of the desorption loops from pressure sensor P2 and at nitrogen source 31 from pressure switch $N_2P1$. Other data inputs include the temperature data from temperature sensors T1,T2,T3 and T4, VOC concentration data from VOC sensors VOC1 and VOC2, and oxygen concentration from sensor $O_21$.

The flow control valves 20,22,24,25 and 40,42,44,45 are pneumatically operated valves operated from an air pressure source under control of PLC 50. An air pressure sensor in the form of an air pressure switch, not shown, is also provided at the source of pressurized air to monitor air pressure at the source of pressurized air. The level of condensate in container 35 is monitored by level sensor 36 which also provides inputs to the PLC 50.

The data outputs 53 from PLC 50 are used to control normal system operation of the automated VOC recovery system and for directing safety in alarm condition responses. A summary of the data outputs 53 for controlling system operation steps and alarm condition responses is set forth in TABLE II. For example the data outputs 53 control the opened and closed position of flow control valves 20,22,24, 25 and 40,42,44,45. Additional data outputs provide control signals for the SLA fan, $N_2$ fan, first and second stages of heater 32, and alarm sounders and lights. Additional data output control signals for the nitrogen gas flow subsystem are described in further detail with reference to FIG. 4 but include control signals for the nitrogen flood control valves for BED A, BED B, and the desorption loops and control signals for the $N_2$ inlet valve from liquid nitrogen storage tanks to the reserve $N_2$ nitrogen source 31.

The programmable logic controller is programmed to recognize threshold values for data inputs 52 summarized in TABLE I for initiating appropriate data outputs 53 for control of system operation steps and alarm condition responses summarized in TABLE II. Thus PLC 50 initiates data output control signals in response to system parameter values monitored by the system parameter sensors reaching or exceeding system parameter threshold values. The PLC 50 is coupled to a local computer 54 capable of monitoring system operation from the data inputs 52 and data outputs 53. From the local PC 54 an operator can override system parameter settings or reprogram the PLC 50 for new applications. The automated control system therefore provides a previously unavailable flexibility for reprogramming and adapting the automated VOC recovery system for different environments and applications and for recovering different types of VOC's and solvents. Similarly the PLC 50 may be accessed from a remote computer 60 over the telephone line 56 using remote and local modems 58,55.

Figure 4:
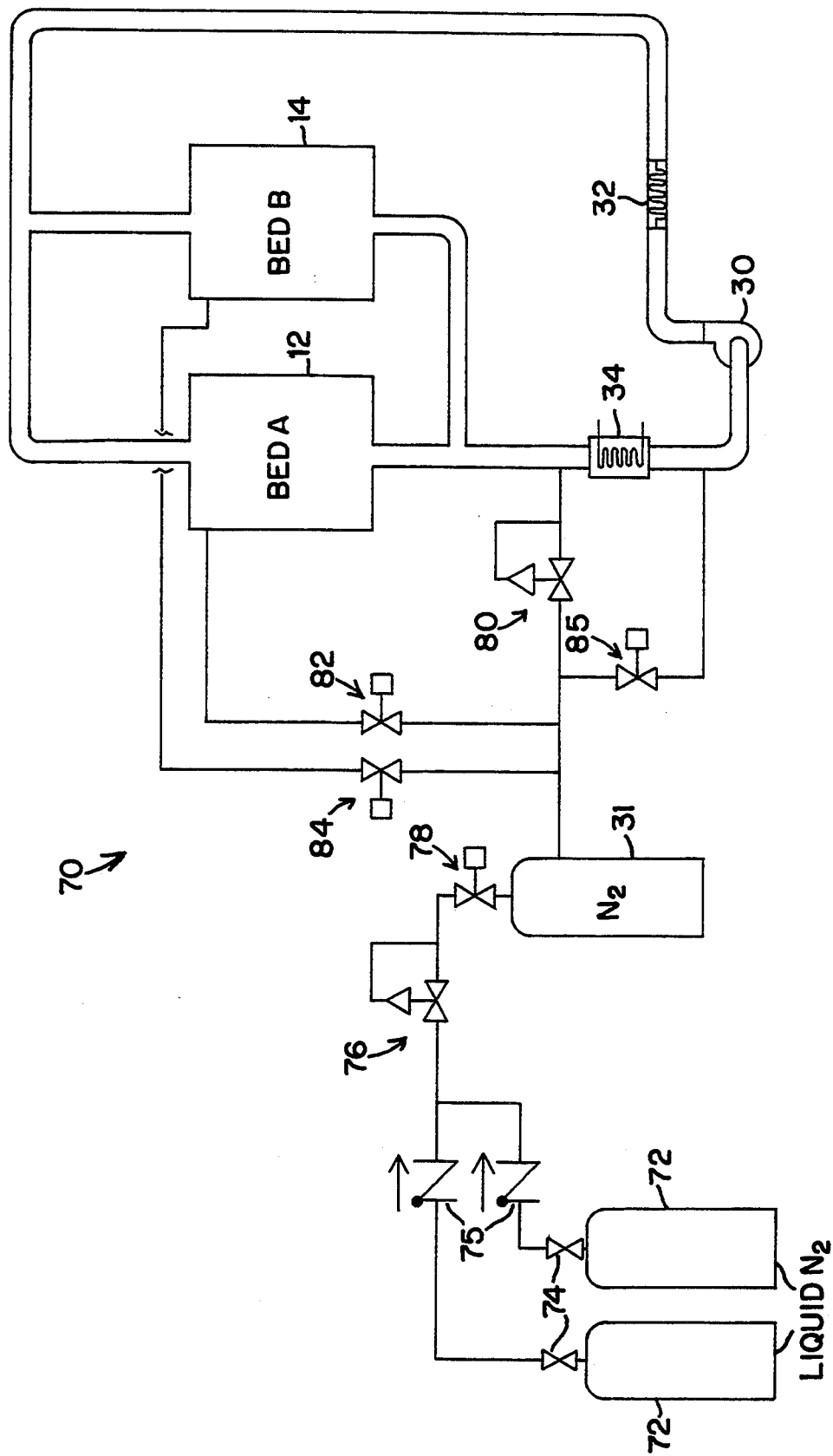
FIG. 4 is a detailed block diagram of the inert desorption gas flow and control subsystem of the automated VOC recovery system.

The inert gas subsystem 70 of the automated solvent recovery system 10 is illustrated in FIG. 4. Elements of the nitrogen subsystem which are the same as the elements of the system diagram of FIGS. 1 and 2 are indicated by the same reference designations. Thus the first and second adsorption beds 12,14, first and second desorption loops 26,28, desorption loop condenser 34, $N_2$ fan 30, heater 32 and reserve nitrogen $N_2$ source 31 are the same elements heretofore described with reference to FIGS. 1 and 2.

As shown in FIG. 4 the nitrogen subsystem 70 includes liquid nitrogen storage tanks 72 with manual release valves 74 and one way check valves 75 coupled to a high pressure differential release valve 76. Nitrogen in the liquid nitrogen storage tanks 72 is maintained at a pressure above a selected pressure threshold for the nitrogen source tank 31 so that the high pressure relief valve 76 can pass additional nitrogen into tank 31 when it falls below the selected pressure threshold. High pressure release valve 76 opens to pass additional nitrogen into the desorption inert nitrogen source tank 31 when the pressure in tank 31 falls below for example, 40–45 psig. The desorption inert gas source 31 is also referred to herein as the $N_2$ reserve storage tank. Valve 78 is a solenoid controlled valve controlled by the programmable logic controller PLC50. PLC50 shuts the solenoid actuated valve 78 in response to an alarm condition as hereafter described.

The nitrogen reserve storage tank 31 referred to herein as the desorption inert gas source is coupled to the desorption loops 26 and 28 through a low pressure reducing valve 80. Low pressure reducing valve 80 releases nitrogen from the reserve storage tank into the desorption loops whenever the pressure in the desorption loops falls below a threshold pressure above atmospheric pressure for example 2 psig. As used herein the units psig designate pressure in pounds per square inch above atmospheric pressure of 14.7 psi.

Additionally the nitrogen source reserve tank 31 is coupled through separate $N_2$ flooding lines to BED A, BED B, and the desorption loops. The flooding line to BED A is controlled by flood control valve 82. The $N_2$ flooding line to BED B is controlled by flood control valve 84. The $N_2$ flooding line to the desorption loops is controlled by flood control valve 85. Each of the flood control valves 82,84, and 85 is a solenoid actuated valve controlled by the PLC 50. The flood control valves 82,84, and 85 are normally closed during the adsorb and desorb cycles of the respective adsorption beds BED A and BED B.

In response to an alarm condition hereafter described, the circulating airstream flow control valves 20,22,24,25 and the desorption inert gas flow control valves 40,42,44, 45 are closed, separately isolating adsorption bed BED A, adsorption bed BED B, and the remainder of the desorption loops. Flood control valves 82,84, and 85 are then opened by PLC 50 flooding with inert nitrogen gas BED A, BED B, and the common portion of the desorption loop. By this arrangement, the automated VOC recovery system is isolated from the plant source of process air and the adsorption beds and desorption loops are flooded with inert gas in an endeavor to prevent development or transmission of hazardous conditions.

A summary of system alarm conditions causing determination of an alarm condition by the programmable logic controller PLC50 is set forth in TABLE III. Each of the identified conditions is sensed by system parameter sensors sensing a system parameter value exceeding a programmed alarm condition threshold level. In each instance determination of an alarm condition initiates a set of alarm condition responses summarized in TABLE IV. In particular, in response to the alarm conditions the automated system shuts off the heater and fans, closes the flow control valves for shutting off the adsorption paths and desorption loops thereby isolating the adsorption beds and desorption loop, and opens the flood control valves releasing nitrogen for flooding each of the adsorption beds and desorption loop. Additionally the PLC 50 turns on desired alarm sounders in the plant turns on alarm lights at respective locations in the plant and in the automated VOC recovery system building.

The alarm conditions identified in TABLE III include $O_2$ concentrations too high in either of the adsorption beds during a desorb cycle when heated nitrogen gas and VOC's create a risk of combustible or explosive conditions. When $N_2$ temperatures into or out of the desorption loop during a desorb cycle are excessive a fire or other hazardous condition is indicated. Differential pressure below a minimum threshold across either fan, the SLA fan or $N_2$ fan, indicates failure of the fan and circulation. Loss of nitrogen pressure at either the $N_2$ reserve tank 31 or in the desorption loop may also cause hazardous conditions and therefore can determine an alarm condition. Excessive VOC concentrations in circulating air out of either adsorption bed exceeding a VOC concentration alarm threshold may also result in hazardous conditions warranting determination of an alarm condition. Excessive temperatures at any of the temperature sensors or excessive temperature differentials between temperature sensors across either of the adsorption beds may also be used to determine alarm conditions.

Finally, TABLE V summarizes example parameters for system parameter threshold values for initiating either system operating steps or alarm conditions. These exemplary values are intended, for example for a particular application namely recovery of solvent such as propanol from the process air in a printing plant. All of the values are programmable and adaptable to new applications and recovery of other VOC's or solvents. Selected threshold values may be overridden in a particular instance or permanently changed by reprogramming the PLC50.

The automated system for the recovery of VOC's is appropriate for any application requiring for example, removal and recovery of solvents released into plant air. Such a typical application is the surface preparation industry including boat building, auto finishing, and painting generally. In the shoe industry the system can be used to remove from process air the solvent degreaser trichloroethane, a solvent used to wash shoe soles. Isopropyl alcohol is often released in materials preparation industries and is readily recovered by the system. The automated system for recovery of VOC's is also applicable for recovery of volatile fractions such as benzene released from contaminated soils. The area can be tented and the automated system is used for recovering VOC's from the air. Underground heat piping can be used to accelerate outgassing. The system can also be used to restore air quality in buildings suffering from the "sick building syndrome". The system can be assembled in modular units on truck flat beds and driven to a site. Tests can be conducted and the system can be fine tuned for optimizing removal and recovery of VOC's in the particular application.

The flow control valves used to control air stream circulation in the adsorption loops and inert gas circulation in the desorption loops can be air actuated valves. Suitable air actuated valves for use in the automated VOC recovery system are, for example the Technaflow (TM) air actuated valves produced by Technaflow, Spokane, Wash. Such valves normally operate at for example 40 psig. An air pressure supply normally in the range of 60–80 psig is provided through an air reserve check valve for operating the air actuated valves. An air pressure sensor at the air pressure supply is coupled to the PLC 50 for monitoring available air pressure.

Figure 6:
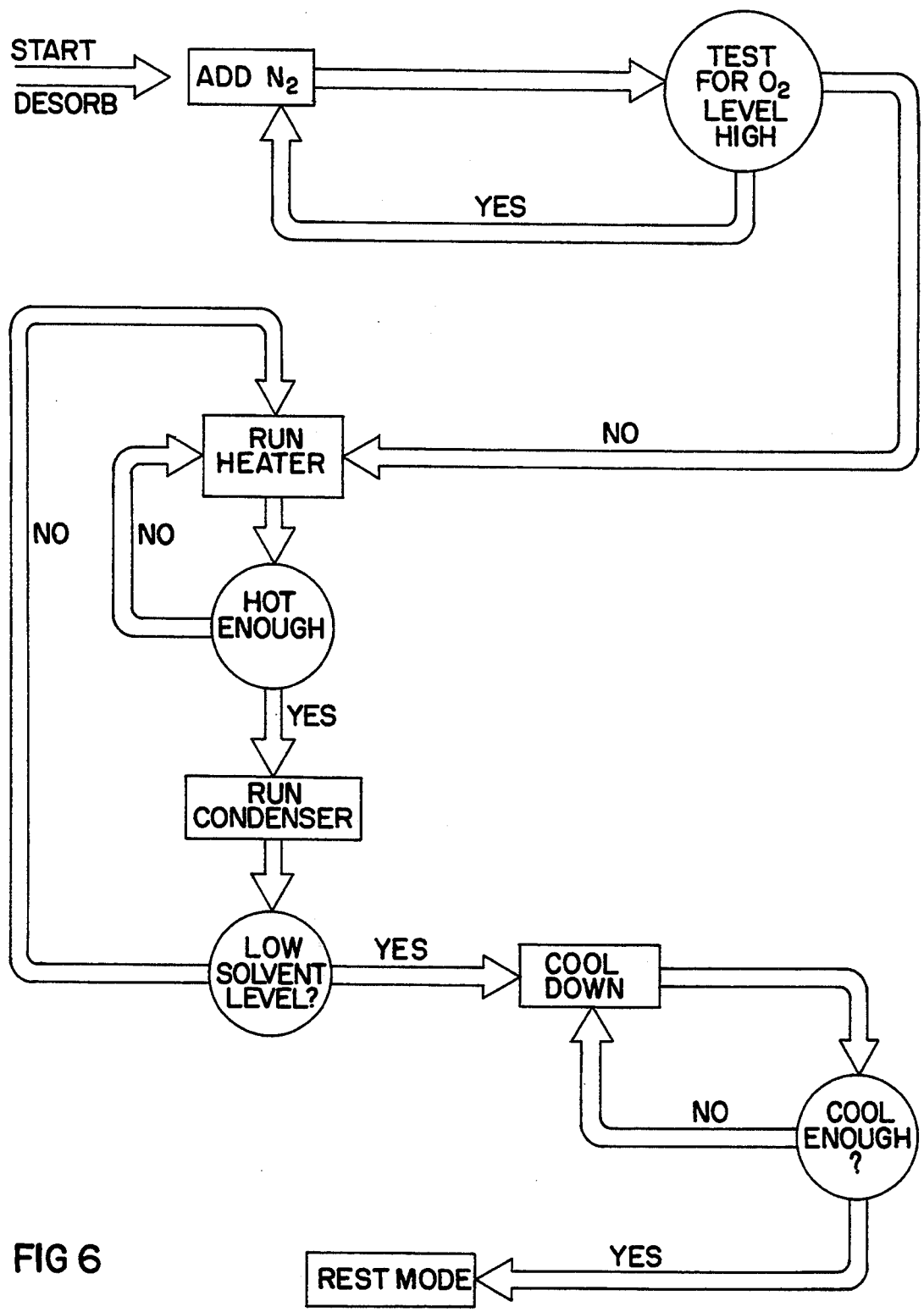
FIG. 6 is a simplified flow chart of the desorb cycle directed by the programmable logic controller.
Figure 5:
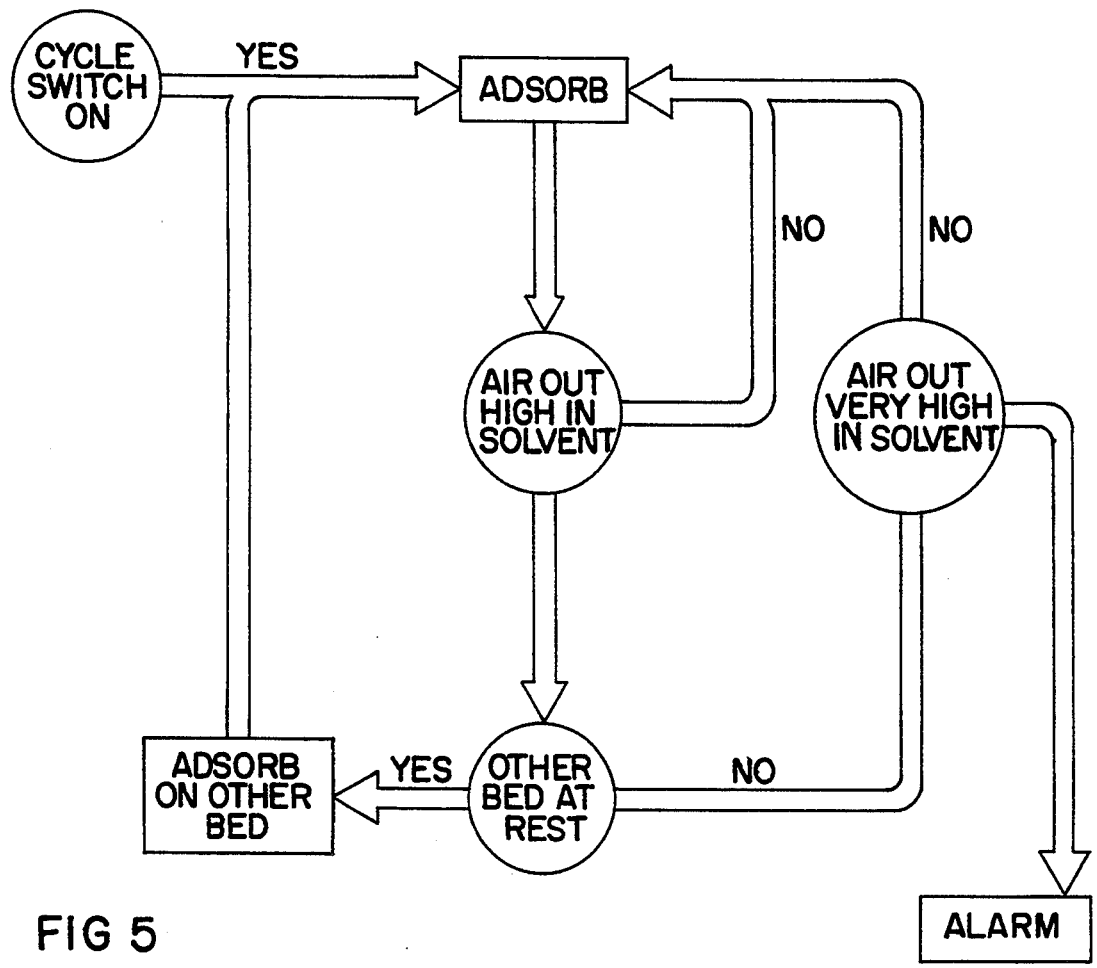
FIG. 5 is a simplified flow chart of the adsorb cycle directed by the programmable logic controller.
Figure 7:
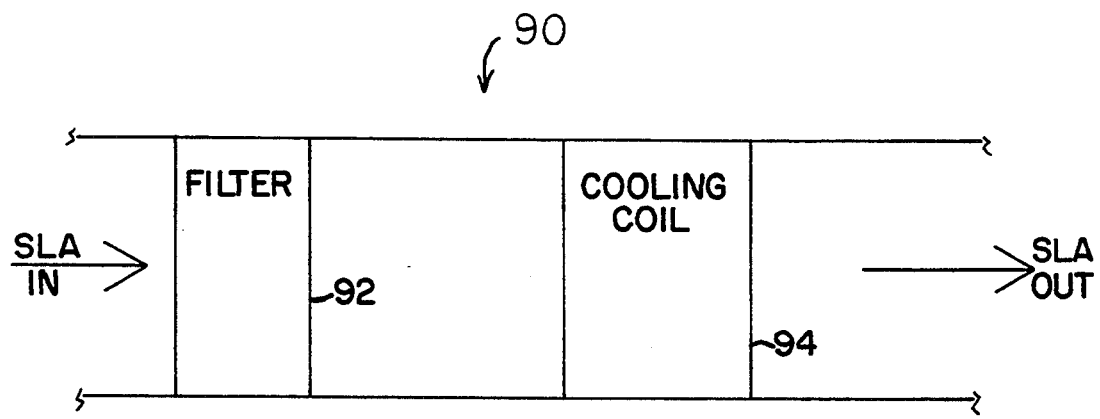
FIG. 7 is a fragmentary block diagram of the process airstream preconditioner mounted upstream from the automated VOC recovery system for protecting the adsorption beds from water vapor and suspended particles.

The programming for the programmable logic controller 50 is summarized in the flow charts of FIGS. 5 and 6. The programming logic for the adsorb cycle is summarized in FIG. 5. "Cycle Switch On" indicates that the adsorption cycle is on and operating. For "cycle switch on" for Bed A, flow control valves 20 and 22 are open as shown in FIG. 1. The adsorb cycle then proceeds as heretofore described until the VOC or solvent concentration in the air out of Bed A exceeds a first threshold for example 400 PPM. The PLC 50 then switches the circulating airstream to the second adsorption path through Bed B. If solvent or VOC concentration becomes excessively high such as greater than 600 PPM, an alarm condition is initiated.

The desorb cycle for BED A is initiated by passing cool nitrogen through the saturated bed as shown for example in FIG. 2. When $O_2$ concentration is sufficiently low, for example less than 1% LEL, the heater heating element stages are turned on to initiate desorption of VOC's from the adsorption bed. When the temperature of the $N_2$ is high enough, for example greater than 260° F., the condenser operates by circulating cooling water through the condensing coil. Once solvent or VOC concentrations are reduced below a low threshold level the heater is turned off and cool nitrogen circulates during a cooling phase until the bed reaches a low temperature threshold. The nitrogen flow control valves are then closed and the regenerated or recharged bed remains in the rest mode until needed for another adsorption cycle.

Throughout the adsorb and desorb cycles occurrence of any of the system alarm conditions summarized in TABLE III results in initiation of the alarm condition response steps summarized in TABLE IV. Additionally an operator at a local or remote PC monitoring system operation can override the programmed parameters of the PLC 50 for direct operator control.

To improve efficiency of the automated VOC recovery system and extend the life of the adsorption beds, a preconditioner 90 is incorporated in the circulating airstream of the plant or process air source. The preconditioner 90 is installed for example at a location upstream from the SLA fan 15 of FIGS. 1 and 2.

The preconditioner 90 incorporates at an upstream position a particulate filter 92 for removing from the exhaust air particles of a size which may clog or interfere in adsorption at the surfaces of the activated carbon or other adsorption bed. For example the particulate filter 92 may be selected with a filter gauge for removing particles down to powder size such as corn starch talc used in a variety of industrial processes under the trademark OXYDRY (TM) which may contaminate the activated carbon bed.

The downstream side of the preconditioner 90 incorporates a cooling coil 94 for condensing water vapor and reducing the water vapor load of the exhaust air SLA. This saves the adsorptive capacity of the adsorption beds for removing VOC's. For example the SLA IN may have a temperature of 100° F. and a humidity ratio of 200, relative humidity approaching 100%. The cooling coil 94 is constructed and arranged for reducing the temperature of the SLA OUT for example to a temperature of 70° F. with a humidity ratio of 60 and a relative humidity preferably of 50% or less.

While the invention has been described with reference to particular example embodiments it is intended to cover all modifications and equivalents within the scope of the following claims.

TABLE I

DATA INPUTS TO PROGRAMMABLE LOGIC CONTROLLER FROM SYSTEM PARAMETER SENSORS

Δ Pressure Across SLA Fan
Δ Pressure Across $N_2$ Fan
$N_2$ Pressure in the $N_2$ Reserve Tank
$N_2$ Pressure in the Common Desorption Loops Portion
Cycle Switch For Adsorb Cycles On or Off
Temperature of Incoming SLA
Temperature of Outgoing Exhaust Air
Temperature of $N_2$ Out Of Heater
Temperature of $N_2$ Into Condenser
VOC Concentration Level at Output of Bed A
VOC Concentration Level at Output of Bed B
$O_2$ Concentration Level in $N_2$ Common Desorption Loop Portion
Air Pressure Switch For Air Pressure Used to Operate Pneumatic Valves
Condensate High Level in Solvent Receiver
Alarm Condition Acknowledge Switch

TABLE II

DATA OUTPUTS FROM PROGRAMMABLE LOGIC CONTROLLER FOR SYSTEM OPERATION & ALARM CONDITION RESPONSES

Actuate Alarm Horn
Actuate Alarm Lights
SLA Fan Starter
$N_2$ Fan Starter
SLA Flow Control Valves (20,22) Bed A
SLA Flow Control Valves (24,25) Bed B
$N_2$ Loop Flow Control Valve (40) Bed A In
$N_2$ Loop Flow Control Valve (42) Bed A Out
$N_2$ Loop Flow Control Valve (44) Bed B In
$N_2$ Loop Flow Control Valve (45) Bed B Out
$N_2$ Flood Control Valve Bed A (84)
$N_2$ Flood Control Valve Bed B (82)
$N_2$ Flood Control Valve For Desorption Loops (85)
$N_2$ Inlet Valve To Reserve $N_2$ Tank From Liquid $N_2$ Storage Tanks (78)
Heater 1st Stage
Heater 2nd Stage

TABLE III

SYSTEM ALARM CONDITIONS

1. $O_2$ In Adsorption Bed A During Desorption > Alarm Threshold
2. $O_2$ In Adsorption Bed B During Desorption > Alarm Threshold
3. $N_2$ Temperature Out of Desorption Loop Too High
4. $N_2$ Temperature Into Desorption Loop Too High
5. SLA Fan On, No Differential Pressure
6. $N_2$ Fan On, No Differential Pressure
7. Solvent or VOC Level In Condensate Tank Too High
8. $N_2$ Desorption Loop Pressure Too Low
9. $N_2$ Reserve Tank Pressure Too Low
10. Δ Temperature Too Great Across Either Adsorption Bed During Adsorption
11. Δ Temperature Too Great Across Either Adsorption Bed During Desorption
12. Δ Temperature Too Great Across Either Adsorption Bed During Cooling Cycle
13. VOC Concentration in Circulating Air Out of Either Adsorption Bed Exceeding a VOC Concentration Alarm Threshold

TABLE IV

ALARM CONDITION RESPONSE STEPS

1. Shut Off Heater
2. Shut Off Both Fans (SLA Fan & $N_2$ Fan)
3. Shut Adsorption Path & Desorption Loop Flow Control Valves (Isolate Adsorption Beds and Desorption Loop From Each Other And Plant)
4. Open Flooding Control Valves To Release $N_2$ and Flood Each Adsorption Bed and Desorption Loop With Inert Gas

TABLE IV-continued

ALARM CONDITION RESPONSE STEPS

5. Turn On Alarm Horn in Plant, Alarm Light In Plant e.g. Red Flasher, and Alarm Light And/Or Sounder In Automated VOC Recovery System Building

TABLE V

EXEMPLARY CONTROL OPERATING PARAMETERS & ALARM THRESHOLD VALUES

1. Adsorption Path VOC Concentration High Limit For Switching Circulating Air Stream From One Adsorption Bed To The Other Bed: VOC Concentration Level > 400 PPM
2. Adsorption Path Very High Limit For Alarm Condition: VOC Concentration > 600 PPM
3. $O_2$ Level For Start Of Desorption And Heating of $N_2$: $O_2$ < 1.0% LEL
4. $O_2$ Level For Desorption Loop Alarm Condition: $O_2$ > 1.5% LEL
5. $N_2$ Temperature For Start of Condensation: $N_2$ Temperature > 260° F.
6. Heater Temperature Setpoint (1st Stage Heating Element): Adsorption Bed & Path Temperature = 357° F.
7. Heater Temperature Setpoint (2nd Stage Heating Element): Adsorption Bed & Path Temperature = 352° F.
8. Cool Down Temperature For Adsorption Bed & Path For Start of Rest Mode: Temperature = 110° F.
9. $N_2$ Desorption Loop Pressure Alarm Condition: $N_2$ Pressure < 10 in. $H_2O$ For > 20 Sec.
10. $N_2$ Reserve Tank Pressure Alarm Condition: $N_2$ Pressure < 20 psi For > 15 Sec.
11. Air Tank Pressure Alarm Condition For Air Pressure Used to Operate Pneumatic Valves: Air Pressure < 20 psi
12. Temperature During Desorption, High Limit Alarm Condition: $N_2$ Temperature > 370° F.
13. SLA Temperature High Limit Alarm Condition: SLA Temperature > 110° F.

We claim:

1. A method for removing and recovering volatile organic compounds (VOC's) from a circulating air stream comprising:

passing the circulating air stream through a first adsorption bed for adsorbing VOC's from the circulating air stream;

sensing the VOC concentration in the circulating air stream downstream from the first adsorption bed;

switching the circulating air stream and passing the circulating air stream through a second adsorption bed when the VOC concentration in the circulating air stream through the first adsorption bed exceeds a threshold first VOC concentration level;

desorbing VOC's from the first adsorption bed by first passing an unheated desorption inert gas through the first adsorption bed to drive out $O_2$;

sensing the $O_2$ concentration in the unheated desorption inert gas downstream from the first adsorption bed;

heating the desorption inert gas passing through the first adsorption bed after sensing an $O_2$ concentration below a threshold first $O_2$ concentration level;

establishing a desorption loop for the heated inert gas including a VOC condenser for recovering VOC's, a circulating inert gas fan, and a heater for heating said desorption inert gas;

sensing VOC concentration in the circulating heated inert gas downstream from the first adsorption bed;

turning off the heater and cooling the first adsorption bed by circulating unheated desorption inert gas in the desorption loop when the sensed VOC concentration falls below a threshold first VOC concentration value;

sensing VOC concentration in the circulating air stream downstream from the'second adsorption bed;

Switching the circulating air stream and passing the circulating airstream through the first adsorption bed when the VOC concentration ,sensed in the circulating air stream downstream from the second adsorption bed exceeds said threshold first VOC concentration value;

sensing temperature of the circulating airstream upstream and downstream of the first and second adsorption beds;

sensing temperature of circulating desorption inert gas upstream and downstream from the first and second adsorption beds;

determining an alarm condition in response to specified system parameters of sensed $O_2$ concentration, temperature, and VOC concentration reaching or exceeding alarm condition threshold values and providing alarm condition response;

determining an alarm condition and providing said alarm condition response upon sensing $O_2$ concentration in the circulating desorption inert gas above a programmed alarm threshold second $O_2$ concentration value greater than the first $O_2$ concentration level;

said alarm condition response comprising closing flow control valves and isolating the first adsorption bed, second adsorption bed, and desorption loop from the circulating air stream and desorption inert gas circulating in the desorption loop, and flooding with inert gas through separate flooding lines the first adsorption bed, second adsorption bed and desorption loop, and turning off the heater.

2. The method of claim 1 comprising determining an alarm condition and providing said alarm condition response upon sensing a temperature differential between upstream and downstream temperatures across one of the first and second adsorption bed greater than a programmed alarm threshold first temperature differential value.

3. The method of claim 1 comprising determining an alarm condition and providing said alarm condition response upon sensing a VOC concentration level in a circulating air stream downstream from one of the first and second adsorption bed above a programmed alarm threshold second VOC concentration level greater than the first VOC concentration value.

4. The method of claim 1 comprising determining an alarm condition and providing said alarm condition response upon sensing a temperature at a temperature sensing location exceeding a programmed absolute alarm threshold temperature value.

5. The method of claim 1 comprising:

circulating the air stream through the first and second adsorption beds using a circulating air stream first fan;

and circulating inert gas through the first and second desorption loop using a circulating desorption inert gas second fan;

monitoring pressure differential across the first and second fans;

and determining an alarm condition and initiating said alarm condition response if the pressure differential across one of said first and second fans falls below a threshold alarm pressure differential value.

6. The method of claim 1 comprising controlling the method using a programmable controller coupled to system parameter sensors', flow control valves, and said heater.

7. The method of claim 6 comprising monitoring the programmable controller, diagnosing the method, and overriding or changing the program of the programmable controller using a computer coupled to the programmable controller.

8. The method of claim 7 comprising monitoring the programmable controller, diagnosing the method, and overriding or changing the program of the programmable controller using a computer at a remote location coupled through modem and telephone lines to the programmable controller.

9. The method of claim 1 comprising preconditioning the circulating air stream before removing and recovering VO's by filtering particulates from the circulating air stream upstream from one of the first and second adsorption beds for protecting said adsorption bed from clogging particles and reducing water vapor load in the circulating air stream upstream from said adsorption bed.

10. The method of claim 9 comprising preconditioning the circulating air stream by reducing relative humidity of the circulating air stream below 50% using a cooling coil for said preconditioning.

11. A system for removing volatile organic compounds (VOC's) from a circulating airstream having first and second adsorption beds, first and second adsorption paths alternately coupling the circulating airstream to the first and second adsorption beds for removing VOC's, a pressurized desorption inert gas source, a VOC condenser, first and second desorption loops alternately coupling the desorption inert gas through the first and second adsorption bed for desorption and regeneration of the first and second adsorption beds and for recovering VOC's in the VOC condenser, and flow control valves for directing the circulating airstream in the first and second adsorption paths and for directing the desorption inert gas in the first and second desorption loops, the improvement comprising:

a plurality of system parameter sensors distributed in the first and second adsorption paths and first and second desorption loops for sensing system parameters;

a programmable controller coupled to the system parameter sensors and flow control valves for controlling the system in response to sensed system parameters;

said flow control valves comprising a plurality of isolation valves in the first and second adsorption paths and first and second desorption loops for isolating the first adsorption bed, second adsorption bed, and desorption loops in response to an alarm condition;

said inert gas source being constructed with separate flooding lines coupled to the first adsorption bed, second adsorption bed, and desorption loops, said flooding lines being controlled by controllable flooding valves coupled to the programmable controller for flooding the first adsorption bed, second adsorption bed, and desorption loops with inert gas in response to an alarm condition;

said programmable controller being programmed to determine an alarm condition in response to specified system parameters sensed by the system parameter sensors reaching or exceeding programmed alarm threshold values and provide an alarm condition response including closing the flow control valves thereby isolating the first adsorption bed, second adsorption bed, and desorption loops, opening the flooding valves and flooding with inert gas the first adsorption bed, second adsorption bed, and said desorption loops;

said system parameter sensors comprising temperature sensors in the adsorption paths and first and second desorption loops upstream and downstream from the first and second adsorption beds, VOC sensors downstream from the first and second adsorption beds, $O_2$ sensor in the first and second desorption loops, and pressure sensors in the first and second desorption loops and at the pressurized desorption inert gas source;

said system parameters causing an alarm condition to be determined by the programmable controller upon reaching programmed alarm threshold values comprising:

$O_2$ concentration sensed in one of the first and second desorption loops during desorption and regeneration of one of the first and second adsorption beds having an $O_2$ concentration value above the programmed alarm threshold first $O_2$ concentration value;

VOC concentration sensed in the circulating air stream downstream from one of the first and second adsorption beds having a value above the programmed alarm threshold first VOC concentration value;

temperature of heated inert gas circulating in one of the first and second desorption loops having a value above the programmed alarm threshold first temperature value;

temperature of the VOC laden circulating air stream sensed upstream from one of the first and second adsorption beds having a value above the programmed alarm threshold second temperature value;

inert gas pressure sensed at the inert gas source having a value below the programmed alarm threshold first pressure value.

12. The system of claim 11 comprising a heater for heating the desorption inert gas, said programmable controller being couple to the heater for turning off the heater in response to an alarm condition.

13. The system of claim 12 wherein the programmable controller is programmed to initiate a desorption cycle for desorption and regeneration of one of the first and second adsorption beds by controlling the flow control valves for switching said adsorption bed from one of the first and second adsorption paths to one of the first and second desorption loops, turning on the circulating inert gas fan and directing unheated inert gas through the adsorption bed to be recharged;

wherein the programmable controller is programmed to detect $O_2$ concentration in the circulating inert gas through the adsorption bed to be recharged;

and wherein the programmable controller is programmed to turn on the heater for a sensed $O_2$ concentration value below a programmed threshold second $O_2$ concentration value less than the threshold first $O_2$ concentration value.

14. The system of claim 11 wherein the system parameters causing an alarm condition to be determined by the programmable controller upon reaching programmed alarm threshold values comprise:

$O_2$ concentration sensed by the $O_2$ sensor in one of the first and second desorption loops during desorption and regeneration of one of the first and second adsorption beds having an $O_2$ concentration value above the programmed alarm threshold first $O_2$ concentration value;

temperature of heated inert gas circulating in one of the first and second desorption loops sensed by a temperature sensor in said desorption loop and having a temperature value above the programmed alarm first temperature threshold value;

temperature of the circulating air stream sensed by a temperature sensor in one of the first and second adsorption paths and having a temperature value above the programmed alarm second temperature threshold value.

15. The system of claim 14 wherein the system parameters causing an alarm condition to be determined by the programmable controller upon reaching programmed alarm threshold values comprise:

inert gas pressure sensed by a pressure sensor at the inert gas source having a pressure value below the programmed alarm threshold first pressure value.

16. The system of claim 15 wherein the system parameters causing an alarm condition to be determined by the programmable controller upon reaching programmed alarm threshold values comprise:

inert gas pressure sensed by a pressure sensor in one of the first and second desorption loops having a pressure value below the programmed alarm threshold second pressure value.

17. The system of claim 14 comprising:

a circulating air stream fan positioned in a common portion of the first and second adsorption paths for circulating the air stream through the first and second adsorption beds;

and a circulating inert gas fan positioned in a common portion of the first and second desorption loops for circulating desorption inert gas through the first and second adsorption beds;

a first differential pressure sensor coupled across the circulating air stream fan;

and a second differential pressure sensor coupled across the circulating desorption inert gas fan;

said first and second differential pressure sensors being coupled to the programmable controller;

said programmable controller being programmed to determine an alarm condition in response to differential pressure sensed across one of the fans having a differential pressure value below the programmed alarm threshold differential pressure value.

18. The system of claim 17 wherein the programmable controller is programmed to initiate a desorption cycle for desorption and regeneration of one of the first and second adsorption beds by turning on the circulating inert gas fan and directing unheated inert gas through the adsorption bed to be recharged;

wherein the programmable controller is programmed to detect $O_2$ concentration in the circulating inert gas through the adsorption bed to be recharged;

and wherein the programmable controller is programmed to turn on the heater for a sensed $O_2$ concentration value below the programmed threshold second $O_2$ concentration value less than the threshold first concentration value.

19. The system of claim 14 wherein the programmable controller upon determination of an alarm condition is constructed to sound an alarm sounder and turn on an alarm light.

20. The system of claim 14 comprising a computer coupled to the programmable controller for programming the programmable controller, for diagnosing system operation from system parameters sensed by the system parameter sensors, for changing or overriding the programming of the programmable controller, and for adapting the system for application in different environments and for recovering different VOC's and solvents.

21. The system of claim 20 wherein the computer is at a location remote from the system and is coupled to the programmable controller through modem and telephone lines.

22. A system for removing and recovering volatile organic chemicals (VOC's) from a circulating air stream having a first adsorption bed, a first adsorption path coupling the circulating air stream to the first adsorption bed for removing VOC's, a second adsorption bed, a second adsorption path coupling the circulating air stream to the second adsorption bed for removing VOC's when the first adsorption bed is saturated, a pressurized desorption inert gas source, a heater for heating the desorption inert gas, and a VOC condenser, a first desorption loop coupling the desorption inert gas through the first adsorption bed for desorption and regeneration of the first adsorption bed and for recovering VOC's in the VOC condenser, a second desorption loop for coupling the desorption inert gas through the second adsorption bed for desorption and regeneration of the second adsorption bed and recovering VOC's in the VOC condenser, and flow control valves for directing the circulating air stream in the first and second adsorption paths and for directing the desorption inert gas in the first and second desorption loops the improvement comprising:

a plurality of system parameter sensors distributed in the first and second adsorption paths and first and second desorption loops for sensing system parameters;

a programmable controller coupled to the system parameter sensors, flow control valves, and heater for controlling the system in response to sensed system parameters;

said system parameter sensors comprising temperature sensors in the first and second adsorption paths and first and second desorption loops upstream and downstream from the first and second adsorption beds, VOC sensors downstream from the first and second adsorption beds, $O_2$ sensor in the first and second desorption loops, pressure sensor in the first and second desorption loops and at the pressurized desorption inert gas source;

said flow control valves comprising a plurality of isolation valves in the first and second adsorption paths and first and second desorption loops for isolating the first adsorption bed, second adsorption bed, and a common portion of the first and second desorption loops in response to an alarm condition;

said inert gas source being constructed with separate flooding lines coupled to the first adsorption bed, second adsorption bed, and a common portion of the desorption loops, said separate flooding lines being controlled by controllable flooding valves coupled to the programmable controller for flooding the first adsorption bed, second adsorption bed, and common portion of the desorption loops with inert gas in response to an alarm condition;

said programmable controller being programmed to determine an alarm condition in response to specified system parameters sensed by the system parameter sensors reaching or exceeding programmed alarm threshold values and provide an alarm condition response including closing the flow control valves thereby isolating the first adsorption bed, second adsorption bed, and a common portion of the first and second desorption loops, opening the flooding valves and flooding with inert gas the first adsorption bed, second adsorption bed, and said common portion of the first and second desorption loops, and turning off the heater.

23. The system of claim 23 wherein the system parameters causing an alarm condition to be determined by the programmable controller upon reaching programmed alarm threshold values comprise:

$O_2$ concentration sensed in one of the first and second desorption loop during desorption and regeneration of one of the first and second adsorption beds having an $O_2$ concentration value above the programmed alarm threshold first $O_2$ concentration value;

VOC concentration sensed in the circulating air stream downstream from one of the first and second adsorption beds having a value above the programmed alarm threshold first VOC concentration value;

temperature of heated inert gas circulating in one of the first and second desorption loops having a value above the programmed alarm threshold first temperature value;

temperature of the VOC laden circulating air stream sensed upstream from one of the first and second adsorption beds having a value above the programmed alarm threshold second temperature value;

inert gas pressure sensed at the inert gas source having a value below the programmed alarm threshold first pressure value.

24. The system of claim 22 comprising:

a circulating air stream first fan coupled in a common portion of the first and second adsorption paths;

a circulating inert gas second fan coupled in a common portion of the first and second desorption loops;

and wherein the system parameter sensors comprise a first differential pressure sensor coupled across the circulating air stream first fan and a second differential pressure sensor coupled across the circulating inert gas second fan.

25. A plurality of systems as set forth in claim 22 constructed in modular units.

26. A plurality of systems as set forth in claim 25 wherein the modular units are mounted on flat bed trucks.

27. The system of claim 22 wherein the first and second adsorption paths comprise a circulating air stream common inlet and a circulating air stream common outlet and further comprising:

a fire stop inlet valve in the common inlet;
a fire stop outlet valve in the common outlet;

said fire stop inlet and outlet valves being constructed for automatic closing in response to temperature above a temperature threshold level for isolating the system.

28. The system of claim 22 comprising a circulating air stream preconditioner positioned in the circulating air stream upstream from the system for removing and recovering VOC's, said preconditioner comprising a cooling coil for reducing water vapor load in the circulating air stream and a particulate filter for removing particles from the circulating air stream that may reduce the efficiency of the adsorption beds.

29. The system of claim 28 wherein the preconditioner cooling coil reduces relative humidity of the circulating air stream to less than 50% and wherein the particulate filter is a high efficiency filter.

30. The system of claim 22 wherein the flow control valves are pneumatically operated valves actuated by an air pressure source and further comprising a pressure sensor at said air pressure source coupled to the programmable controller, said programmable controller being programmed for determining an alarm condition upon sensing a pressure level at the air pressure source pressure sensor less than an alarm threshold third pressure value necessary for operation of the pneumatically operated valves.

* * * * *